United States Patent [19]
Oh

[11] Patent Number: 5,686,978
[45] Date of Patent: Nov. 11, 1997

[54] METHOD FOR MANUFACTURING A POLYMER-DISPERSED LIQUID CRYSTAL DISPLAY PANEL

[75] Inventor: Jong-seo Oh, Suwon, Rep. of Korea

[73] Assignee: Samsung Electronics Co., Ltd., Kyungki-Do, Rep. of Korea

[21] Appl. No.: 634,379

[22] Filed: Apr. 18, 1996

[30] Foreign Application Priority Data

May 13, 1995 [KR] Rep. of Korea ............. 95-11816

[51] Int. Cl.⁶ ....................................... G02F 1/1333
[52] U.S. Cl. .................. 349/93; 349/89; 349/90; 349/92
[58] Field of Search ................. 349/89, 90, 92, 349/93

[56] References Cited

U.S. PATENT DOCUMENTS

| | | |
|---|---|---|
| 5,011,624 | 4/1991 | Yamagishi et al. ............... 349/93 |
| 5,096,282 | 3/1992 | Margerum et al. ............... 349/93 |
| 5,289,300 | 2/1994 | Yamazaki et al. ............... 349/93 |
| 5,583,671 | 12/1996 | Yoshida et al. ............... 349/93 |

*Primary Examiner*—William L. Sikes
*Assistant Examiner*—Julie Ngo
*Attorney, Agent, or Firm*—Sughrue,Mion,Zinn,Macpeak & Seas, PLLC

[57] ABSTRACT

A method for manufacturing a liquid crystal display panel having a polymer/liquid crystal composite film (PDLCD panel). The method includes the steps of preparing an upper substrate including active circuit portions having a pixel electrode and a TFT element and a capacitor, preparing a lower substrate including a black matrix, a color filter and common electrodes, joining the upper and lower substrates with a spacer to define a cell gap therebetween, injecting a composition comprising a liquid crystal, a UV curable monomer, a photo-curing initiator and a UV absorbent into the gap, and illuminating the composition with UV light.

3 Claims, 1 Drawing Sheet

METHOD FOR MANUFACTURING A POLYMER-DISPERSED LIQUID CRYSTAL DISPLAY PANEL

BACKGROUND OF THE INVENTION

1. Field of the Invention

The present invention relates to a method for manufacturing a liquid crystal display (hereinafter, referred to as an "LCD"), and more particularly to a method for manufacturing a polymer-dispersed liquid crystal display (hereinafter, referred to as a "PDLCD") which is an LCD having a liquid crystal/polymer composite film having improved light transmitting and light interrupting properties.

2. Description of the Related Art

A TN (twisted nematic) LCD or an STN (super twisted nematic) LCD panel requires two polarizing plates, one on each side thereof. However, such polarizing plates reduce light transmittance resulting in a deterioration of luminance of the screen. For example, when a color filter is employed, the light transmittance is lowered to less than 10%, which means that the incident light is not efficiently used. Therefore, there is an increasing demand for an improved LCD that does not require the polarizing plates.

In accordance with theory that refractive differences between polymer and liquid crystal can be controlled depending on whether an electrical field is applied or not, an LCD having the liquid crystal/polymer composite film, i.e., the PDLCD is being widely studied.

The PDLCD utilizes the principle that the light-transmitting property of the liquid crystal/polymer composite film is changed based on whether an electrical field is applied or not. The PDLCD panel has a thin film transistor provided at each cell which acts as a switching element.

FIG. 1 shows a polymer/liquid crystal composite film manufactured according to the conventional method. As shown in FIG. 1, an uncured region 6 is formed to cause a deterioration in the light-interrupting and light-transmitting properties.

In more detail, a PDLCD panel 1 is formed as follows. First, an upper substrate including an active circuit portion 2 and a lower substrate including a black matrix 3 and a color filter (not shown) are prepared. Then, the two substrates are joined by a spacer (not shown) to define a cell gap therebetween. A composition comprising a UV curable polymer precursor (monomer and/or oligomer), a liquid crystal, and a curing agent fills the cell gap, and UV light 4 is then illuminated from a fixed position outside of the upper substrate, thereby curing the monomer and/or oligomer.

When the polymer/liquid crystal composite film is formed according to the conventional method, a uniformly cured region 5 is formed at the center of the pixel due to the light transmitted thereto, while uncured region 6 is formed between active circuit portion 2 and black matrix 3 because little light is transmitted to this area.

Since the liquid crystal, monomer, and/or oligomer left in the uncured region can permeate into the cured liquid crystal/polymer composite over time, the light transmitting and light-interrupting properties deteriorate significantly in the PDLCD over time.

SUMMARY OF THE INVENTION

An object of the present invention is to provide a method for manufacturing a liquid crystal display panel having a uniformly-formed polymer/liquid crystal composite film which improves light-transmitting and light-interrupting properties.

To achieve the above object, the present invention provides a method for manufacturing a polymer-dispersed liquid crystal display panel having a polymer/dispersed liquid crystal composite film comprising the steps of: preparing an upper substrate including a pixel electrode and an active circuit portion having a TFT element and a capacitor; preparing a lower substrate including a black matrix, a color filter, and a common electrode; joining the upper and the lower substrates while defining a cell gap therebetween; injecting a composition comprising a liquid crystal, a UV curable monomer, a photo-curing initiator, and a UV absorbent into the cell gap; and illuminating UV light toward the upper substrate from the outside thereof.

Since the polymer/liquid crystal composite film is uniformly formed, the panel formed according to the present invention has good light refraction and light scattering properties. Furthermore, mechanical properties can be uniformly established according to the desired design conditions to thereby enhance its life expectancy.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

According to the present invention, a polymer/liquid crystal composite film is formed by illuminating, with UV light, a composition having a UV absorbent in addition to a UV curable polymer precursor, a liquid crystal, and other curing agents.

The UV absorbent facilitates the polymerization of the monomer and oligomer even in the region where light is not directly incident. The photo-curing initiator releases free radicals by UV illumination to initiate the polymerization of the UV curable polymer precursor. However, if UV light is insufficiently illuminated between the active circuit portion and the black matrix, the free radicals do not form properly, which results in an uncured region.

The UV absorbent of the invention is added to overcome this problem and absorbs UV light passing nearby and then uses energy therefrom, to release free radicals into the region not sufficiently illuminated by UV light. Such UV absorbents include carbon black and hydroxybenzophenone, for example.

There are not any special restrictions on the type of the UV curable polymer precursor that can be used, as long as it is mixed well with the liquid crystal in its uncured state. However, once the curing process is completed, it must be sufficiently phase-separated into two components, i.e., the liquid crystal and the polymer, in a known manner. Furthermore, it is preferable that the UV curable polymer precursor is a mixture of at least one kind of monomer and/or oligomer. The photo-curing initiator used in the composition for the polymer/liquid crystal composite film, includes benzoin, azobisisobutyronitrile or the like.

Figure 1:
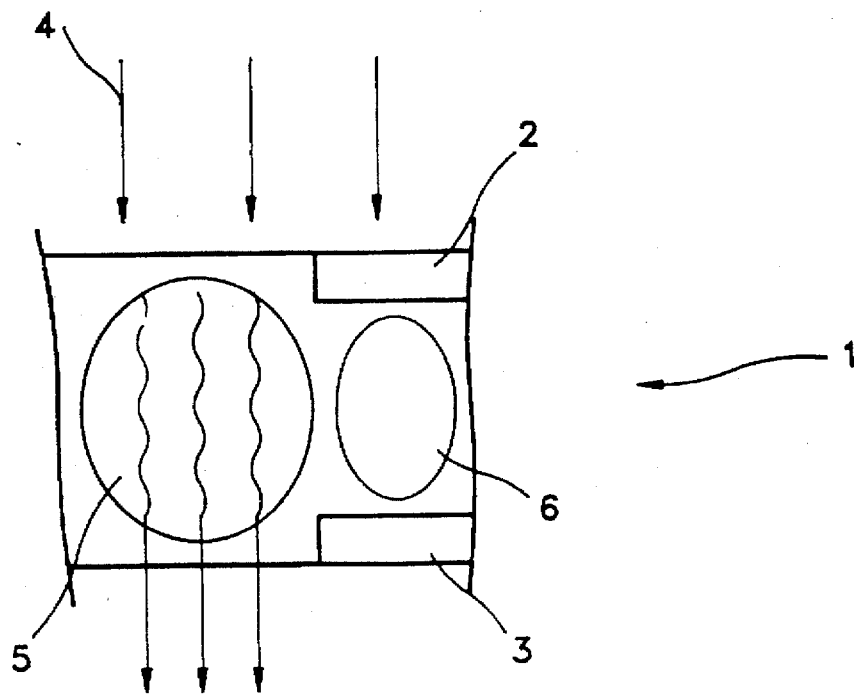
FIG. 1 schematically shows a polymer/liquid crystal composite film formed according to the conventional curing method.
Figure 2:
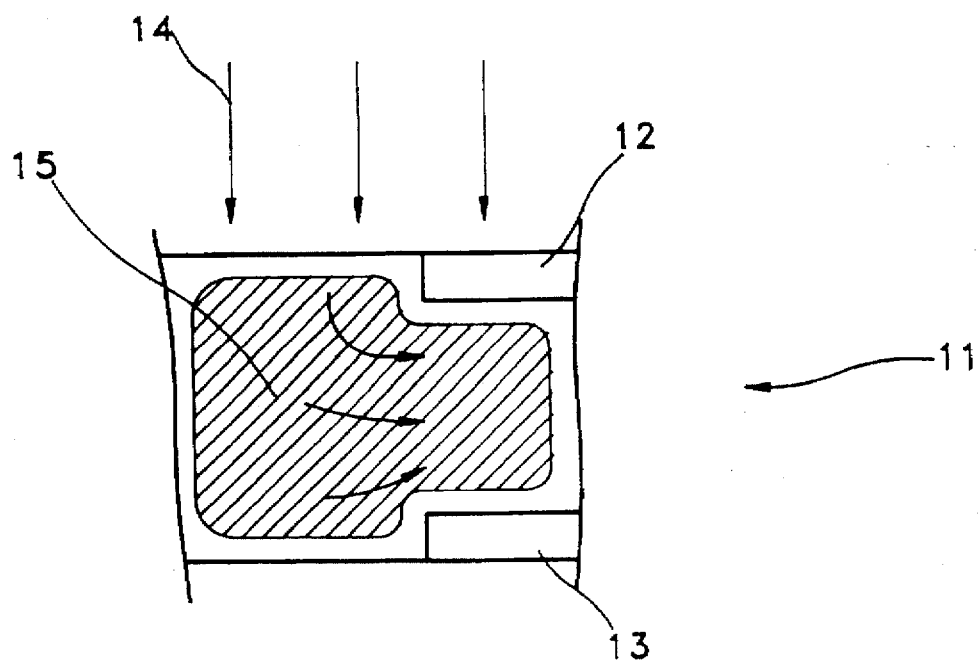
FIG. 2 schematically shows a polymer/liquid crystal composite film formed according to the curing method of the present invention.

As illustrated in FIG. 2, according to a preferred embodiment of the present invention, a composition for the polymer/liquid crystal composite film as described above is prepared, and a substrate including an active circuit portion 12 and another substrate including a black matrix 13 and a color filter (not shown) are joined with a cell gap defined therebetween by a spacer (not shown). Then, the composition for the polymer/liquid crystal composite film is injected into the cell gap and UV light 14 is illuminated thereto to cure the UV curable polymer precursor, thereby forming a liquid crystal display panel 11 having a polymer/liquid crystal composite film 15. It is preferable that the wavelength of the UV light is 2,000 to 4,000 Å, and the source thereof is a mercury arc lamp.

The photo-curing process uses light having energy of more than a predetermined value. That is, the light used for curing should have a frequency of more than the predetermined value. The photo-curing process is carried out by the energy of the light wave represented by the following equation:

$$E = h\nu$$

Wherein, h is Planck's constant ($6.626 \times 10^{-34}$ J.s) and $\nu$ is the frequency of the light wave. The above equation implies that a larger frequency generates more energy and a wave having less than a predetermined frequency will not effect the photo-curing process at any illumination level.

The area of the unilluminated region should be minimized to uniformly cure the composition for polymer/liquid crystal composite film even in the unilluminated region. Therefore, the illumination is carried out by placing the UV source close to each side of the liquid crystal panel and varying the illumination angle during the photo-curing process. Thus, the unilluminated area can be remarkably reduced as compared with the conventional vertical illumination method.

The use of the UV absorbent and changing the illumination angle results in a more uniform curing process when compared with the conventional art. Furthermore, the light-transmitting and light-interrupting properties of the PDLCD can be improved and its life expectancy can be enhanced. Because the uncured region is minimized or eliminated entirely.

What is claimed is:

1. A method for manufacturing a polymer-dispersed liquid crystal display panel having a polymer/liquid crystal composite film, said method comprises the steps of:

preparing an upper substrate including pixel electrodes and active circuit portions consisting essentially of a TFT element and a capacitor;

preparing a lower substrate including a black matrix, a color filter, and common electrodes;

joining said upper and said lower substrates by a cell gap defined by a spacer therebetween;

injecting a composition comprising liquid crystal, a UV curable monomer, a photo-curing initiator and a UV absorbent into said cell gap; and illuminating the composition with UV light.

2. A method as claimed in claim 1, wherein said composition further comprises a UV curable oligomer.

3. A method as claimed in claim 1, wherein, in said illuminating step, the UV light is illuminated from a side of the upper substrate and a side of the lower substrate and an illumination angle is varied.

* * * * *